(12) United States Patent
Heo et al.

(10) Patent No.: US 8,830,433 B2
(45) Date of Patent: Sep. 9, 2014

(54) LIQUID CRYSTAL DISPLAY PANEL AND LIQUID CRYSTAL DISPLAY DEVICE HAVING THE SAME

(71) Applicant: Samsung Display Co., Ltd, Yongin (KR)

(72) Inventors: Jeonguk Heo, Asan-si (KR); Chang-Jae Yu, Seoul (KR)

(73) Assignee: Samsung Display Co., Ltd. (KR)

( * ) Notice: Subject to any disclaimer, the term of this patent is extended or adjusted under 35 U.S.C. 154(b) by 72 days.

(21) Appl. No.: 13/726,488

(22) Filed: Dec. 24, 2012

(65) Prior Publication Data

US 2014/0002761 A1    Jan. 2, 2014

(30) Foreign Application Priority Data

Jun. 29, 2012   (KR) .......................... 10-2012-0071258

(51) Int. Cl.
*G02F 1/1337*   (2006.01)
(52) U.S. Cl.
USPC ............................ 349/141; 349/129; 349/142
(58) Field of Classification Search
USPC ......................................... 349/129, 141, 142
See application file for complete search history.

(56) References Cited

U.S. PATENT DOCUMENTS

| | | | |
|---|---|---|---|
| 7,633,586 B2 | 12/2009 | Winlow et al. | |
| 7,667,808 B2 | 2/2010 | Yamashita | |
| 8,004,644 B2 | 8/2011 | Kurasawa | |
| 2007/0152998 A1 | 7/2007 | Ahn et al. | |

FOREIGN PATENT DOCUMENTS

| | | |
|---|---|---|
| JP | 2010-128126 | 6/2010 |
| KR | 10-20000060543 | 10/2000 |
| KR | 10-2007-0103811 | 10/2007 |
| KR | 10-2008-0013286 | 2/2008 |
| KR | 10-2009-0052221 | 5/2009 |
| KR | 10-2011-0072217 | 6/2011 |
| KR | 10-2011-0095451 | 8/2011 |

*Primary Examiner* — Phu Vu
(74) *Attorney, Agent, or Firm* — Innovation Counsel LLP

(57) ABSTRACT

A liquid crystal display device includes a liquid crystal display panel, two polarizing plates, and a backlight unit. A pixel included in the liquid crystal display panel is divided into a first domain and a second domain and includes a second electrode and a third electrode. The third electrode is insulated from and overlapped with the second electrode. First liquid crystals disposed in the first domain are twisted in a direction different from a direction in which the second liquid crystals disposed in the second domain are twisted. The liquid crystal display device selectively drives the second electrode and the third electrode, thereby controlling a viewing angle thereof.

18 Claims, 17 Drawing Sheets

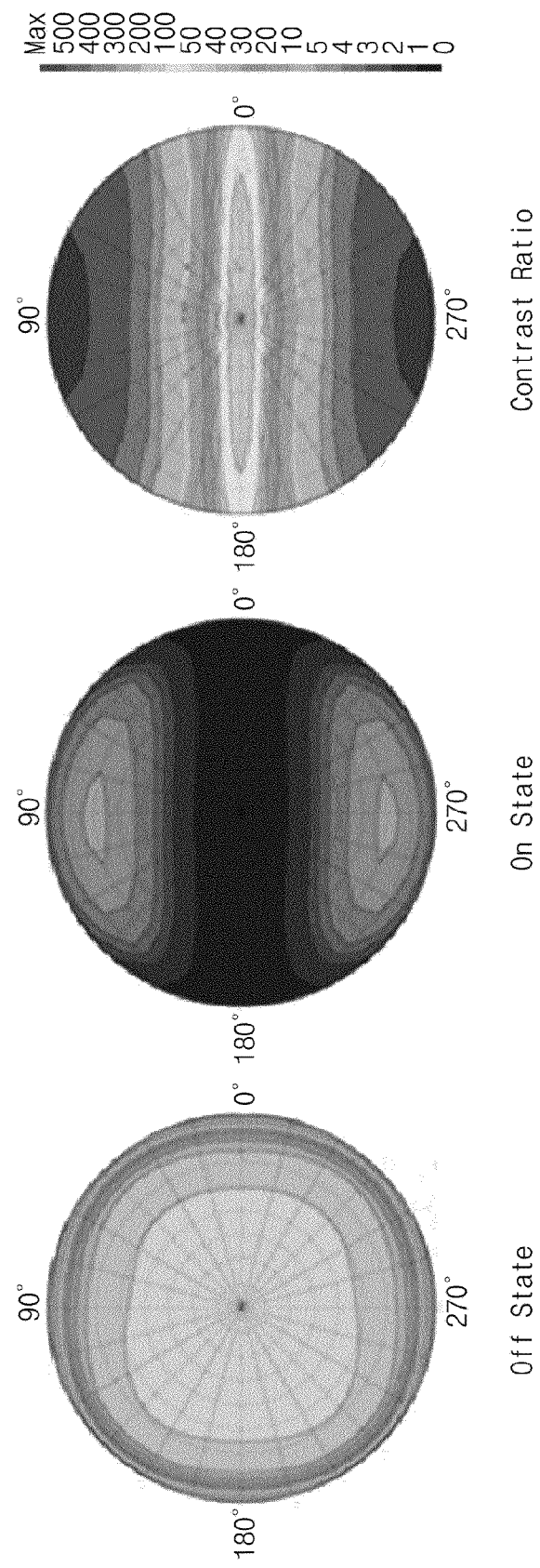

Contrast Ratio Of Wide Viewing Angle Mode

Contrast Ratio Of Narrow Viewing Angle Mode

Contrast Ratio Of Wide Viewing Angle Mode

Contrast Ratio Of Narrow Viewing Angle Mode

LIQUID CRYSTAL DISPLAY PANEL AND LIQUID CRYSTAL DISPLAY DEVICE HAVING THE SAME

CROSS-REFERENCE TO RELATED APPLICATION

This U.S. non-provisional patent application claims priority under 35 U.S.C. §119 of Korean Patent Application No. 10-2012-0071258, filed on Jun. 29, 2012, the contents of which are hereby incorporated by reference.

BACKGROUND

1. Field of Disclosure

Embodiments of the present disclosure relate to a liquid crystal display panel and a liquid crystal display device having the same. More particularly, the present disclosure relates to a liquid crystal display panel capable of controlling a viewing angle and a liquid crystal display device having the liquid crystal display panel.

2. Description of the Related Art

A liquid crystal display device is a thin display device that includes two substrates and a liquid crystal layer disposed between the two substrates. The liquid crystal display device includes two polarizers and a backlight unit that supplies light.

In recent, a liquid crystal display device has been developed to perform various functions according to user requirements. Particularly, demands for liquid crystal display devices have steadily grown in various fields, such as information sharing, information protection, in accordance with the kind of information to be displayed.

The liquid crystal display device, which is developed in consideration of the multiple uses, controls its viewing angle in accordance with the kind of information. For instance, the liquid crystal display device narrows the viewing angle to shield data from on-lookers in case that the information is required to be protected from unauthorized viewers, and widens the viewing angle to show the data to the viewers in case that the information is required to be shared.

SUMMARY

Embodiments of the present disclosure provide a liquid crystal display panel capable of being operated in wide viewing angle mode and a narrow viewing angle mode.

Embodiments of the present disclosure provide a liquid crystal display device having the liquid crystal display panel.

Embodiments of the inventive concept provide a liquid crystal display panel includes a first substrate that includes a first electrode, a second substrate that includes a pixel, and a twisted nematic liquid crystal layer disposed between the first substrate and the second substrate. The liquid crystal display panel is operated in a wide viewing angle mode or a narrow viewing angle mode providing a viewing angle different from a viewing angle of the wide viewing angle mode.

The pixel is divided into a first domain and a second domain. The twisted nematic liquid crystal layer includes first liquid crystals disposed in the first domain and second liquid crystals disposed in the second domain and twisted in a direction different from a direction in which the first liquid crystals are twisted.

The pixel includes a second electrode and a third electrode insulated from and overlapped with the second electrode and including a plurality of slits formed therethrough.

According to embodiments, a first driving voltage is applied between the first electrode and the second electrode in the wide viewing angle mode to form a vertical electric field in the twisted nematic liquid crystal layer, and the first liquid crystals and the second liquid crystals are aligned vertical to the first substrate and the second substrate by the vertical electric field.

According to embodiments, a second driving voltage is applied between the second electrode and the third electrode in the narrow viewing angle mode to form a horizontal electric field in the twisted nematic liquid crystal layer, and the first liquid crystals and the second liquid crystals are aligned substantially in parallel to the first substrate and the second substrate by the horizontal electric field.

According to embodiments, the first substrate includes a first alignment layer disposed on the first electrode, and the second substrate includes a second alignment layer disposed on the third electrode. The second alignment layer has a first alignment axis in an area corresponding to the first domain, and the second alignment layer has a second alignment axis in an area corresponding to the second domain, which is opposite to the first alignment axis. The first alignment layer has a third alignment axis substantially perpendicular to the first alignment axis and the second alignment axis.

Embodiments of the inventive concept provide a liquid crystal display device includes a liquid crystal display panel, a first polarizer, a second polarizer, and a backlight unit. The liquid crystal display panel is operated in a wide viewing angle mode and a narrow viewing angle mode, which provide different viewing angles from one another.

The first polarizer is disposed under the liquid crystal display panel and has a first transmission axis. The second polarizer is disposed on the liquid crystal display panel and has a second transmission axis crossing the first transmission axis. The backlight unit is disposed under the first polarizer to provide a light to the liquid crystal display panel.

According to the above, the liquid crystal display panel and the liquid crystal display device provide different viewing angles in accordance with the wide viewing angle mode and the narrow viewing angle mode. That is, the liquid crystal display panel and the liquid crystal display device provide the viewing angle in accord with the kind of information, and thus the liquid crystal display panel and the liquid crystal display device satisfies user's demands.

The liquid crystal display device further includes the negative C-plate having the thickness direction refractive index smaller than the surface direction refractive index, so that the liquid crystal display device provides relatively wider viewing angle in the wide viewing angle mode and relatively narrower viewing angle in the narrow viewing angle mode.

BRIEF DESCRIPTION OF THE DRAWINGS

The above and other advantages of the embodiments of the present invention will become readily apparent by reference to the following detailed description when considered in conjunction with the accompanying drawings wherein:

FIGS. 7A and 7B are views showing characteristics of viewing angle of the liquid crystal display device shown in FIG. 1;

DETAILED DESCRIPTION

Figure 1:
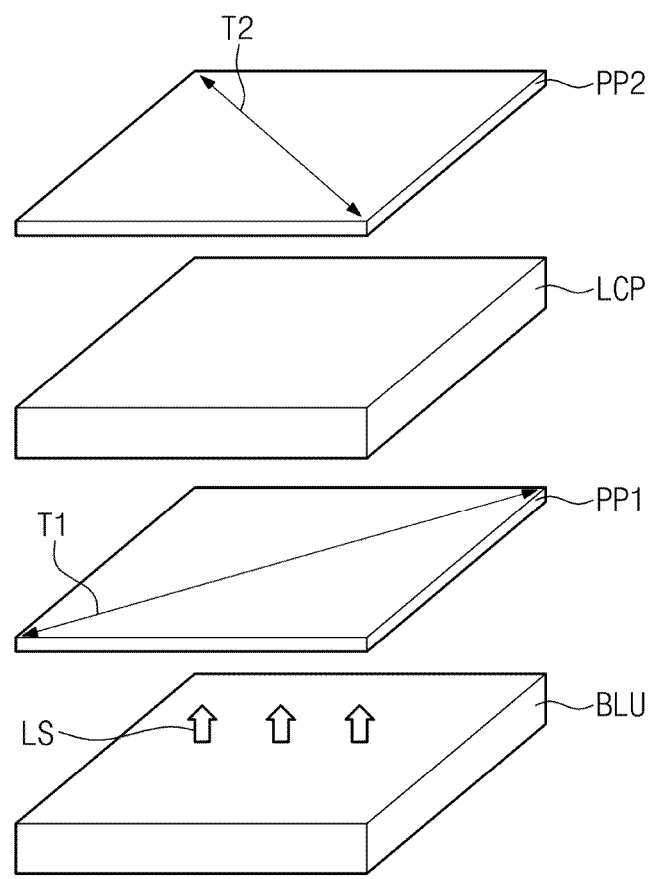
FIG. 1 is an exploded perspective view showing a liquid crystal display device according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", an and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments of the present invention will be explained in detail with reference to the accompanying drawings.

FIG. 1 is an exploded perspective view showing a liquid crystal display device according to an exemplary embodiment of the present invention.

Referring to FIG. 1, a liquid crystal display device includes a liquid crystal display panel LCP, polarizers PP1 and PP2 respectively disposed at upper and lower portions of the liquid crystal display panel LCP, and a backlight unit BLU disposed under the liquid crystal display panel LCP while interposing the polarizer PP1 therebetween to supply light LS to the liquid crystal display panel LCP.

The liquid crystal display panel LCP includes two substrates (not shown) facing each other and a twisted nematic liquid crystal layer (not shown) interposed between the two substrates. Liquid crystal directors in the twisted nematic liquid crystal layer are successively twisted from one of the two substrates to the other one of the two substrates.

Among the polarizers PP1 and PP2, a first polarizer PP1 disposed under the liquid crystal display panel LCP has a first transmission axis T1 along a first direction. The first polarizer PP1 linearly polarizes the light LS, which is incident thereto, in the first direction. A second polarizer PP2 disposed on the liquid crystal display panel LCP has a second transmission axis T2 substantially perpendicular to the first transmission axis T1. The polarizers PP1 and PP2 may be formed inside of an upper substrate and a lower substrate.

The backlight unit BLU provides the light LS to the liquid crystal display panel LCP. The backlight unit BLU includes a light source, such as a cold cathode fluorescent lamp, a light emitting diode, etc. The backlight unit BLU is classified into a direct-illumination type backlight unit and an edge-illumination type backlight unit according to a position of the light source. The edge-illumination type backlight unit includes a light guide plate. In addition, the backlight unit BLU may further include optical sheets, e.g., a prism sheet, a diffusion sheet, etc., to improve optical properties.

When the liquid crystal display panel LCP is in an inactivated state, an optical axis of the light incident to the twisted nematic liquid crystal layer rotates along the liquid crystal directors by an optical activity. Accordingly, the light incident into the first polarizer PP1 is linearly polarized in the first direction. The linearly-polarized light in the first direction passes through the second polarizer PP2 after being rotated by about 90 degrees. That is, the liquid crystal display device has a normally white mode.

Figure 2:
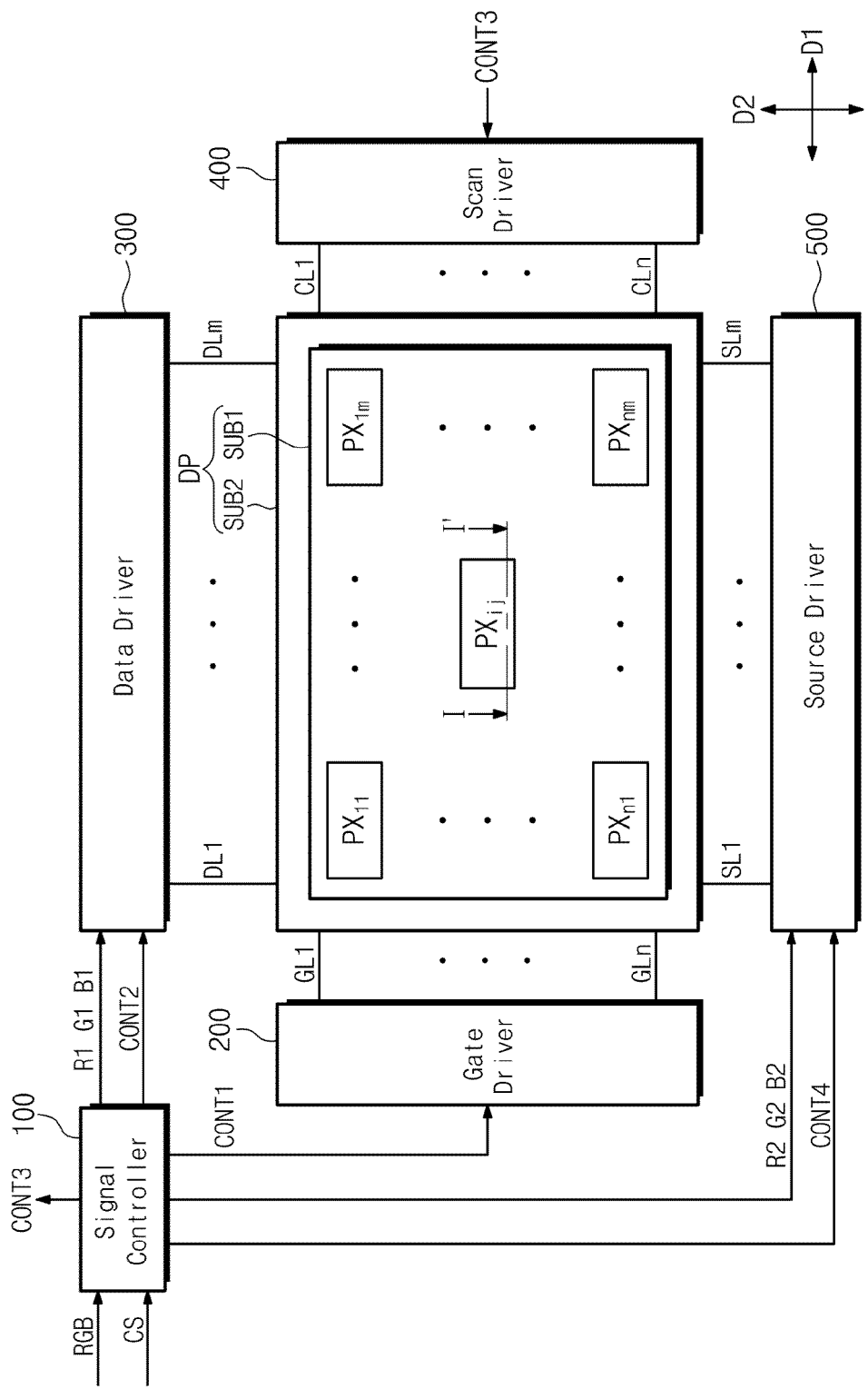
FIG. 2 is a block diagram showing a liquid crystal display panel shown in FIG. 1.
Figure 3:
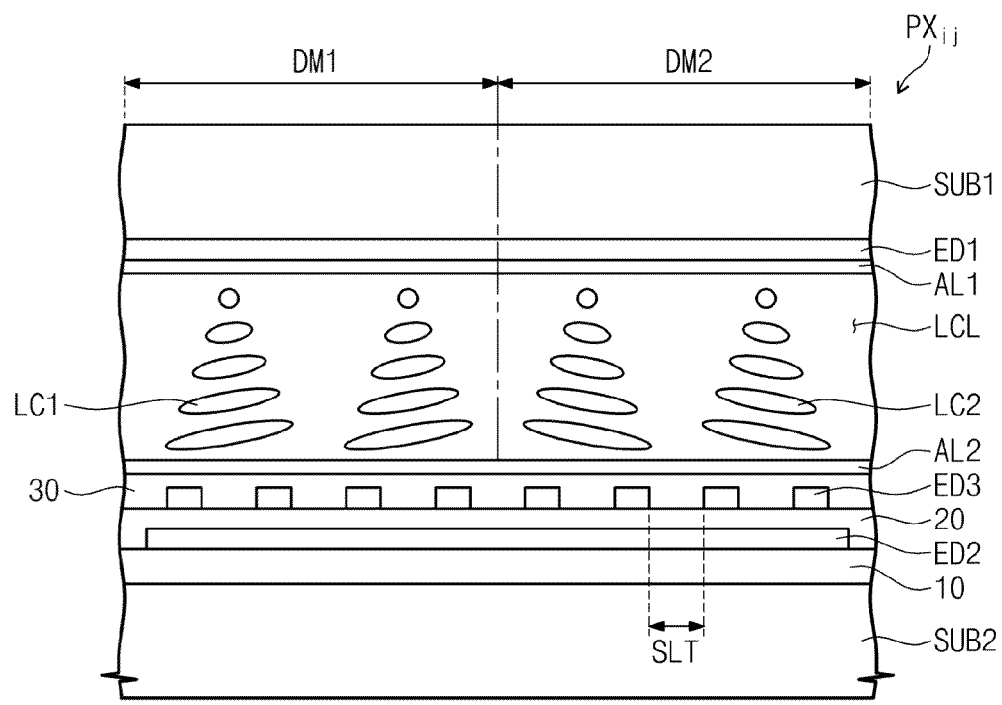
FIG. 3 is a cross-sectional view taken along a line I-I' shown in FIG. 2.

FIG. 2 is a block diagram showing a liquid crystal display panel shown in FIG. 1 and FIG. 3 is a cross-sectional view taken along a line I-I' shown in FIG. 2. Hereinafter, the liquid crystal display panel LCP will be described in detail with reference to FIGS. 2 and 3.

Referring to FIG. 2, the liquid crystal display panel LCP includes a signal controller 100, a gate driver 200, a data driver 300, a scan driver 400, a source driver 500, and a display panel DP.

The signal controller 100 receives input image signals RGB and converts the input image signals RGB to image data R1G1B1 and R2G2B2 in consideration of an operation condition of the display panel DP. In addition, the signal controller 100 receives various control signals CS, such as a vertical synchronization signal, a horizontal synchronization signal, a main clock signal, a data enable signal, etc., and outputs first, second, third, and fourth CONT1, CONT2, CONT3, and CONT4.

In addition, the signal controller 100 determines the operation mode of the display panel DP on the basis of information extracted from the input image signals RGB or a selection signal from an external source (not shown). That is, the signal controller 100 determines whether the display panel DP is operated in the wide viewing angle mode or the narrow viewing angle mode.

The signal controller 100 drives the gate driver 200 and the data driver 300 in the wide viewing angle mode and drives the scan driver 400 and the source driver 500 in the narrow viewing angle mode. The signal controller 100 applies first image data R1G1B1 to the data driver 300 in the wide viewing angle mode and applies second image data R2G2B2 to the source driver 500 in the narrow viewing angle mode.

The first control signal CONT1 and the second control signal CONT2 are used to control activation or inactivation of the gate driver 200 and the data driver 300 in accordance with the operation mode of the display panel DP. In addition, the third control signal CONT3 and the fourth control signal CONT4 are used to control activation or inactivation of the scan driver 400 and the source driver 500 in accordance with the operation mode of the display panel DP.

When the operation mode of the display panel DP is the wide viewing angle mode, the gate driver 200 and the data driver 300 are activated and the scan driver 400 and the source driver 500 are inactivated. When the operation mode of the display panel DP is the narrow viewing angle mode, the gate driver 200 and the data driver 300 are inactivated and the scan driver 400 and the source driver 500 are activated.

The gate driver 200 applies gate signals to a plurality of gate lines GL1 to GLn in response to the first control signal CONT1. The first control signal CONT1 includes a vertical start signal that starts an operation of the gate driver 200, a gate clock signal that determines an output timing of a gate voltage, and an output enable signal that determines an on-pulse width of the gate voltage.

The data driver 300 receives the second control signal CONT2 and the first image data R1G1B1. The data driver 300 converts the first image data R1G1B1 to data voltages and applies the data voltages to a plurality of data lines DL1 to DLm. The second control signal CONT2 includes a horizontal start signal that starts an operation of the data driver 300, an inversion signal that inverts a polarity of the data voltage, and an output indication signal that determines an output timing of the data voltage from the data driver 300.

The scan driver 400 substantially corresponds to the gate driver 200 and the source driver 500 substantially corresponds to the data driver 300. The scan driver 400 drives a plurality of scan lines CL1 to CLn as the gate driver 200 drives the gate lines GL1 to GLn. In addition, as the data driver 300 drives the data lines DL1 to DLm, the source driver 500 drives a plurality of source lines SL1 to SLm.

Meanwhile, the gate driver 200 and the scan driver 400 are separated from each other as shown in FIG. 2, but the gate driver 200 and the scan driver 400 may be integrated with each other. That is, the integrated driver drives either the gate lines GL1 to GLn or the scan lines CL1 to CLn in accordance with the operation mode. The data driver 300 and the source driver 500 may be integrated with each other.

The display panel DP includes a first substrate SUB1 and a second substrate SUB2 facing the first substrate SUB1. The twisted nematic liquid crystal layer is disposed between the first substrate SUB1 and the second substrate SUB2.

The gate lines GL1 to GLn, the data lines DL1 to DLm, the scan lines CL1 to CLn, and the source lines SL1 to SLn are disposed on the second substrate SUB2.

The gate lines GL1 to GLn are extended in a first direction D1, and the data lines DL1 to DLm are extended in a second direction D2 crossing the first direction D1. The scan lines CL1 to CLn are alternately arranged with the gate lines GL1 to GLn and extended in the first direction D1. The source lines SL1 to SLm are alternately arranged with the data lines DL1 to DLm and extended in the second direction D2.

The second substrate SUB2 includes a plurality of pixels PX11 to PXnm. Each of the pixels PX11 to PXnm is connected to a corresponding gate line of the gate lines GL1 to GLn and a corresponding data line of the data lines DL1 to DLm. In addition, each of the pixels PX11 to PXnm is connected to a corresponding scan line of the scan lines CL1 to CLn and a corresponding source line of the source lines SL1 to SLm.

The pixels PX11 to PXnm are arranged in n rows by m columns. The pixels PX11 to PXnm have the same structure and function, and thus one pixel PXij shown in FIG. 3 will be described in detail as a representative example.

Referring to FIG. 3, a first electrode ED1 is disposed on a surface of the first substrate SUB1. The first electrode ED1 is applied with a voltage determined according to the operation mode of the display panel DP. For instance, the first electrode ED1 may be applied with a ground voltage. The gate driver 200 or the scan driver 400 applies the ground voltage to the first electrode ED1.

A first alignment layer AL1 is disposed on the surface of the first substrate SUB1 to cover the first electrode ED1. Although not shown in figures, an insulating layer is disposed between the first electrode ED1 and the first alignment layer AL1.

The pixel PXij includes a second electrode ED2 and a third electrode ED3 disposed to overlap with the second electrode ED2. The third electrode ED3 is insulated from the second electrode and includes a plurality of slits SLT.

The second electrode ED2 and the third electrode ED3 are individually controlled. The operation mode of the liquid crystal display panel LCP is determined by the control method of the first electrode ED1, the second electrode ED2, and the third electrode ED3.

The second electrode ED2 and the first electrode ED1 form a vertical electric field, and the second electrode ED2 and the third electrode ED3 form a horizontal electric field. The vertical electric field is formed during the wide viewing angle mode and the horizontal electric field is formed during the narrow viewing angle mode. This will be described in detail with reference to FIGS. 5A, 5B, 6A, and 6B.

A first insulating layer 10 is disposed on the second substrate SUB2 and the second electrode ED2 is disposed on the first insulating layer 10. Although not shown in FIG. 3, the first insulating layer 10 may include a plurality of thin layers, which is formed of an organic layer, an inorganic layer or a combination thereof.

A second insulating layer 20 is disposed on the first insulating layer 10 to cover the second electrode ED2. The second insulating layer 20 may include a plurality of thin layer formed of an organic layer, an inorganic layer or a combination thereof.

The third electrode ED3 is disposed on the second insulating layer 20. In addition, a third insulating layer 30 may be disposed on the second insulating layer to cover the third electrode ED3. The third insulating layer 30 protects the third electrode ED3. A second alignment layer AL2 is disposed on the third insulating layer 30 or on the third electrode ED3. The second alignment layer AL2 has an alignment axis substantially perpendicular to that of the first alignment layer AL1.

The pixel PXij is divided into a first domain DM1 and a second domain DM2, which have different alignments of liquid crystals. Among the liquid crystals of the twisted nematic layer LCL, a portion of the liquid crystals (hereinafter, referred to as first liquid crystals LC1) is twisted in a counter-clockwise direction and the other portion of the liquid crystals (hereinafter, referred to as second liquid crystals LC2) is twisted in a clockwise direction.

The second alignment layer AL2 has different alignment axes according to its area. The twisted direction of the first liquid crystals LC1 and the second liquid crystals LC2 is determined by the combination of the alignment axis of the first alignment layer AL1 and the alignment axes of the second alignment layer AL2.

Hereinafter, the alignment axes will be described in detail with reference to FIGS. 4A and 4B.

Figure 4A:
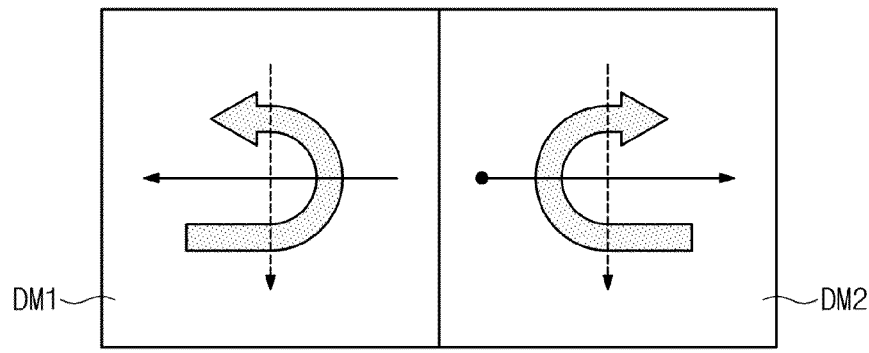
FIGS. 4A and 4B are views explaining a method of forming a multi-domain in a pixel according to an exemplary embodiment of the present invention.
Figure 4B:
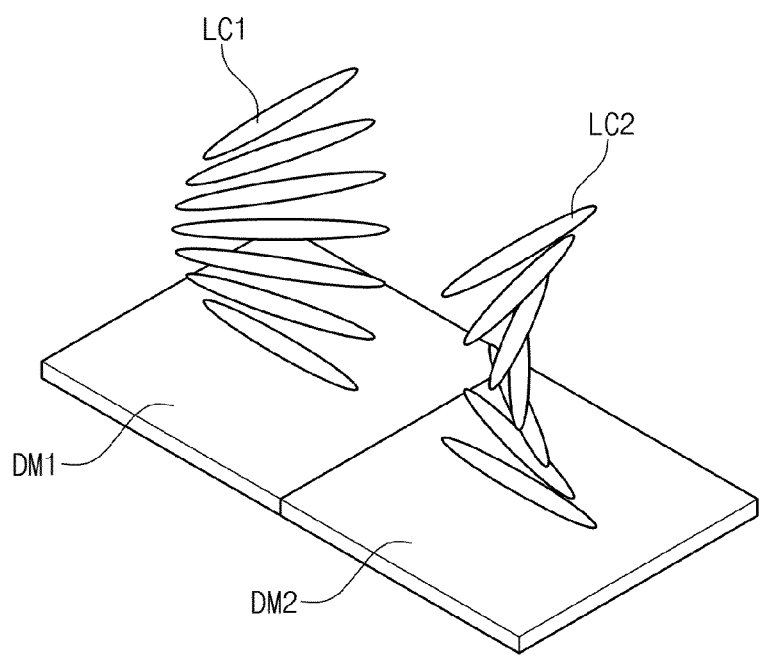

FIGS. 4A and 4B are views explaining a method of forming a multi-domain in a pixel according to an exemplary embodiment of the present invention.

Referring to FIG. 4A, a first alignment axis AD1 of the first alignment layer AL1 (refer to FIG. 3) has a negative Y-axis component. Accordingly, the first alignment axis AD1 of the first alignment layer AL1 may be substantially parallel to the second transmission axis T2 of the second polarizer PP2.

A second alignment axis AD2 corresponding to the first domain DM1 of the second alignment layer AL2 has a negative X-axis component. On the other hand, a third alignment axis AD3 corresponding to the second domain DM2 of the second alignment layer AL2 has a positive X-axis component. Here, the second alignment axis AD2 and the third alignment axis AD3, which have different directivities each other, may be substantially parallel to the first transmission axis T1 (refer to FIG. 1) of the first polarizer PP1.

As shown in FIG. 4B, the first liquid crystals LC1 corresponding to the first domain DM1 are twisted in the counter-clockwise direction by the first alignment axis AD1 and the second alignment axis AD2. In this case, a twisted angle of the first liquid crystals LC1 is about 90 degrees.

The second liquid crystals LC2 corresponding to the second domain DM2 are twisted in the clockwise direction by the first alignment axis AD1 and the third alignment axis AD3.

Each of the first alignment axis AD1, the second alignment axis AD2, and the third alignment axis AD3 indicates a rubbing direction in a corresponding area of the first and second alignment layers AL1 and AL2. That is, the first alignment layer AL1 is rubbed in the negative Y direction to form the first alignment axis AD1. When the second alignment layer AL2 is rubbed in the negative X direction and the positive X direction according to its area, the second alignment axis AD2 and the third alignment axis AD3 are formed.

Besides, the first alignment axis AD1, the second alignment axis AD2, and the third alignment axis AD3 may be formed by an optical alignment. In particular, the second alignment axis AD2 is formed by irradiating light onto the second alignment layer AL2 in the negative X direction after a portion of the second alignment layer AL3 is covered by a mask, and the third alignment axis AD3 is formed by irradiating light onto the second alignment layer AL2 in the positive X direction after the other portion of the second alignment layer AL2 is covered by a mask.

In addition, different from those shown in FIGS. 4A and 4B, the first alignment layer AL1 may be rubbed in multiple directions so as to form multi-domains. In this case, the first alignment layer AL1 has different alignment axes from one another according to its area and the second alignment layer AL2 has one alignment axis. The first domain DM1 and the second domain DM2 may be formed according to the above-mentioned method.

Further, four domains may be formed by the combination of the rubbing directions or the optical alignment of the first alignment layer AL1 and the second alignment layer AL2. In detail, the first alignment layer AL1 has an alignment axis of the negative Y direction in first and second domains among the four domains and has an alignment axis of the positive Y direction in third and fourth domains among the four domains. In addition, the second alignment has an alignment axis of the negative X direction in the first and third domains of the four domains and has an alignment axis of the positive X direction in the second and fourth domains of the four domains.

Figure 5A:
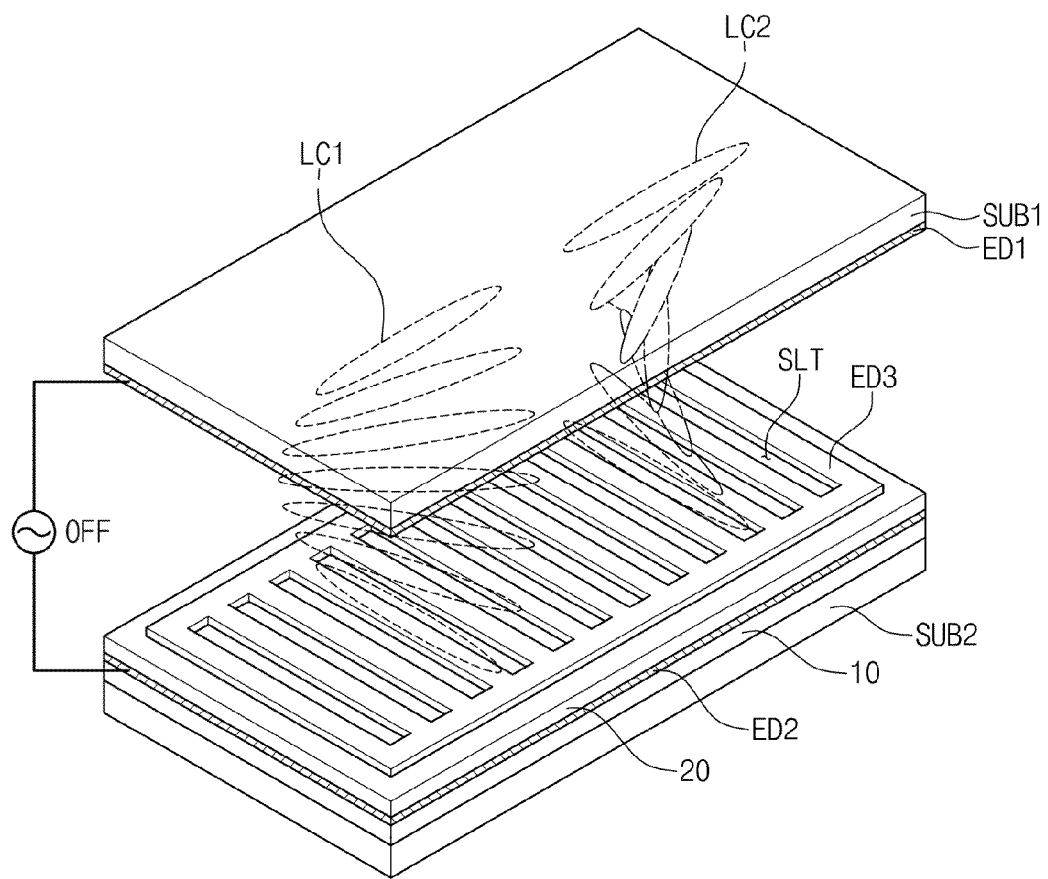
FIGS. 5A and 5B are views showing a liquid crystal display panel operated in a wide viewing angle mode.
Figure 5B:
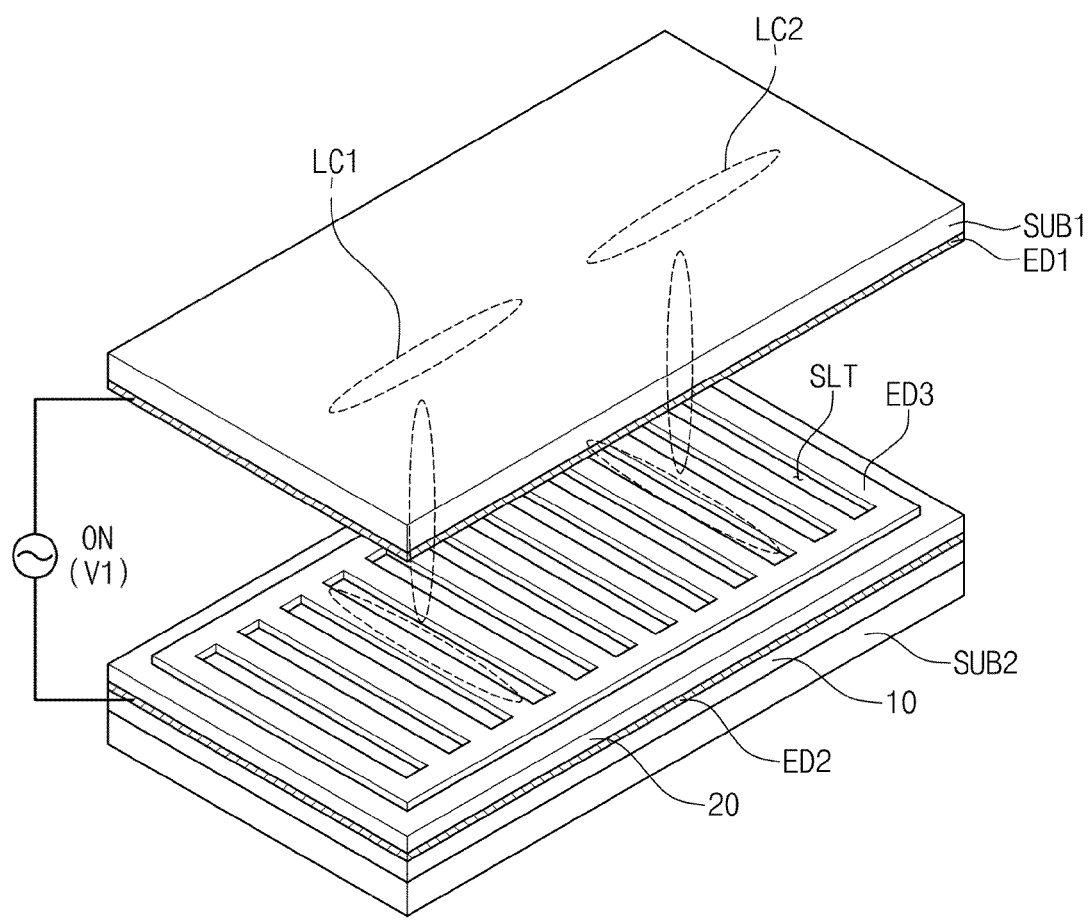
Figure 6A:
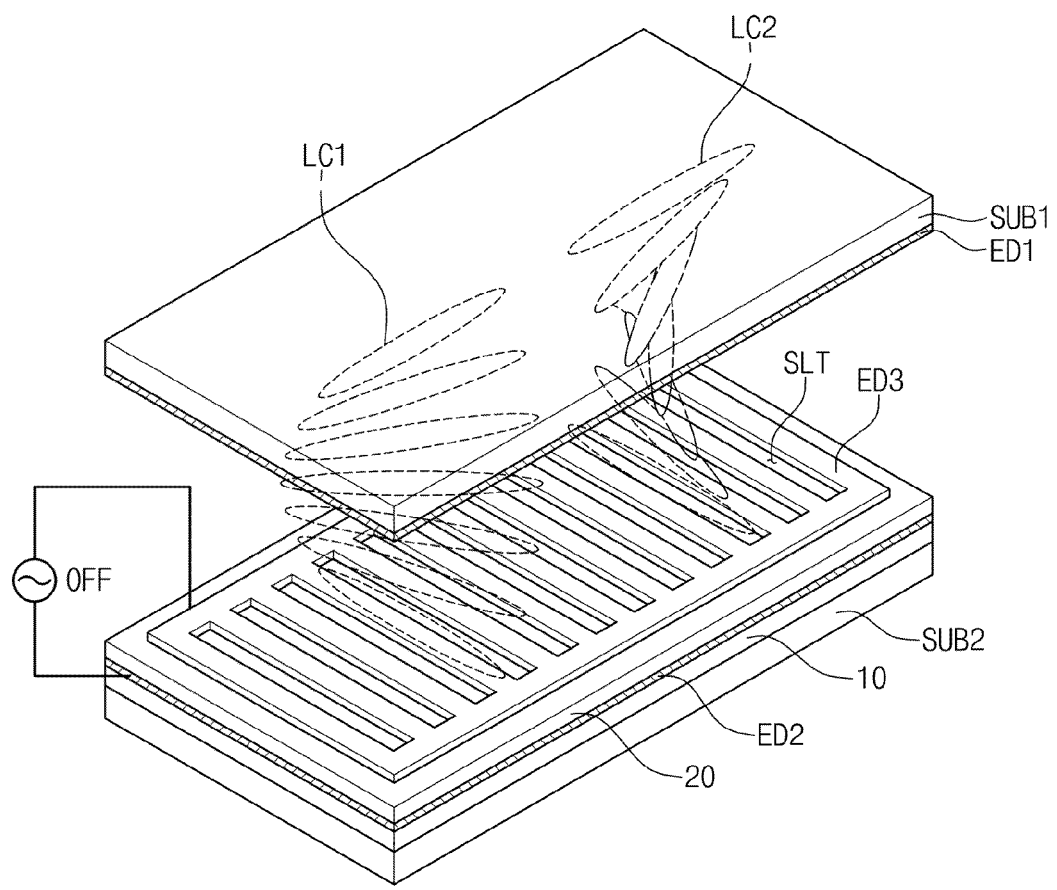
FIGS. 6A and 6B are views showing a liquid crystal display panel operated in a narrow viewing angle mode.
Figure 6B:
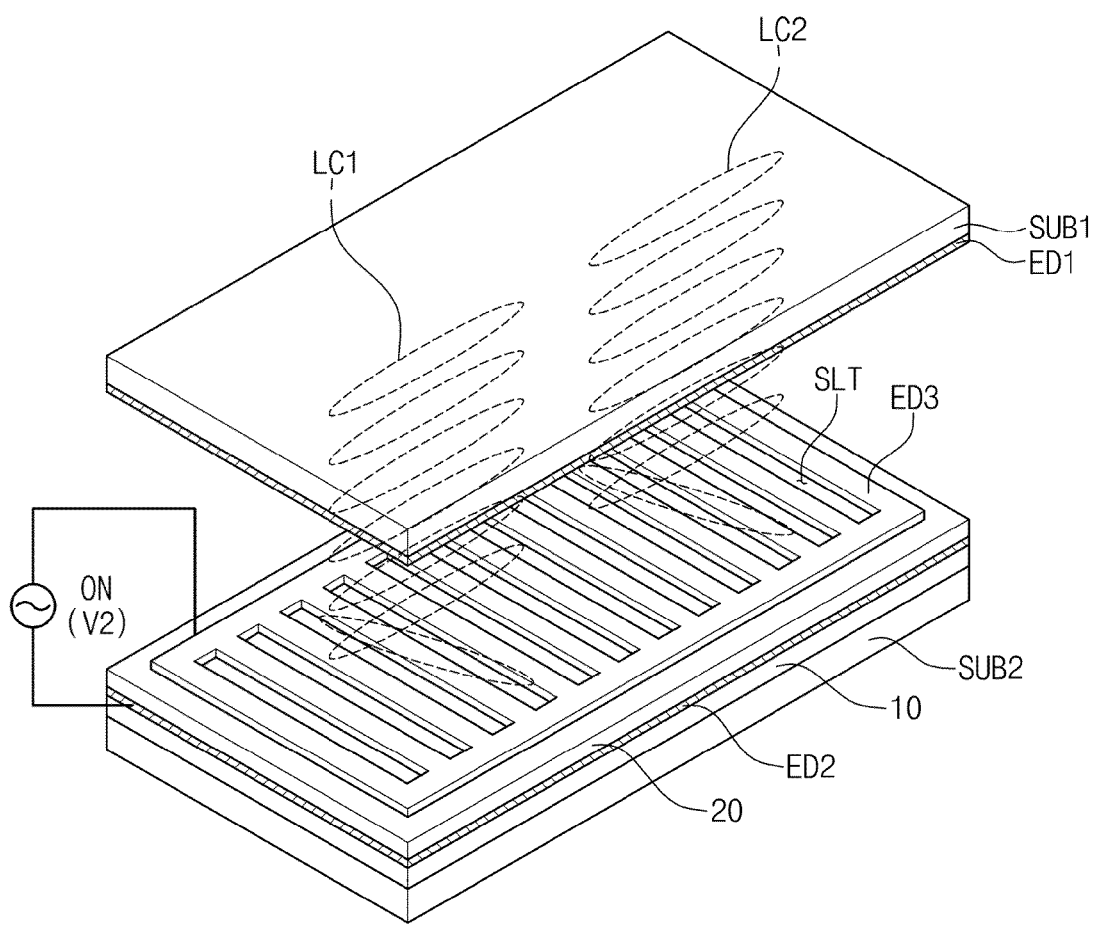

FIGS. 5A and 5B are views showing a liquid crystal display panel operated in a wide viewing angle mode and FIGS. 6A and 6B are views showing a liquid crystal display panel operated in a narrow viewing angle mode. Hereinafter, the operation of the liquid crystal display panel will be described with reference to FIGS. 5A, 5B, 6A, and 6B.

FIG. 5A shows an off state of the liquid crystal display panel operated in the wide viewing angle mode and FIG. 5B shows an on state of the liquid crystal display operated in the wide viewing angle mode.

The off state shown in FIG. 5A indicates that no electric field is formed between the first electrode ED 1 and the second electrode ED2. In the off state, an electric potential difference does not occur between the first electrode ED1 and the second electrode ED2.

The on state shown in FIG. 5B indicates that the electric field is formed between the first electrode ED1 and the second electrode ED2. In the on state, a first driving voltage V1 is applied to between the first electrode ED1 and the second electrode ED2.

As shown in FIG. 5A, the linearly-polarized light in the first direction, which passes through the first polarizer PP1 in the off state of the wide viewing angle mode, is twisted about 90 degrees while passing through the twisted nematic liquid crystal layer LCL and passes through the second polarizer PP2 disposed on the display panel DP. Thus, the liquid crystal display device has a white image.

As shown in FIG. 5B, the first electrode ED1 and the second electrode ED2 receive different voltages from one another in the on state of the wide viewing angle mode. For instance, the first electrode ED1 receives the ground voltage and the second electrode ED2 receives the voltage of about 5 volts to about 7 volts. Accordingly, the vertical electric field is formed between the first electrode ED1 and the second electrode ED2. In this case, the third electrode ED3 maintains a floating state in which a voltage is not applied to the third electrode ED3. Therefore, the third electrode ED3 does not exert influence on the vertical electric field.

According to the vertical electric field, the liquid crystals LC1 and the second liquid crystals LC2 are substantially vertically aligned with respect to the first substrate SUB1 and the second substrate SUB2.

Here, the term of "substantially vertically arranged" indicates the state in which the liquid crystals are arranged in a conventional twisted-nematic mode liquid crystal display device according to the vertical electric field. In other words, an inclination angle of liquid crystal directors in a center area between the first substrate SUB1 and the second substrate SUB2 is not required to be equal to an inclination angle of liquid crystal directors in areas adjacent to the first substrate SUB1 and the second substrate SUB2. The liquid crystal directors in the center area between the first substrate SUB1 and the second substrate SUB2 are vertically aligned with respect to the first substrate SUB1 and the second substrate SUB2.

FIG. 6A shows an off state of the liquid crystal display panel operated in the narrow viewing angle mode and FIG. 6B shows an on state of the liquid crystal display operated in the narrow viewing angle mode.

The off state shown in FIG. 6A indicates that no electric field is formed between the second electrode ED2 and the third electrode ED3. In the off state, an electric potential difference does not occur between the second electrode ED2 and the third electrode ED3.

The on state shown in FIG. 6B indicates that the electric field is formed between the second electrode ED2 and the third electrode ED3. In the on state, a second driving voltage V2 is applied to between the second electrode ED2 and the third electrode ED3.

As shown in FIG. 6A, the off state of the narrow viewing angle mode is the same as the off state of the wide viewing angle mode.

Referring to FIG. 6B, the second electrode ED2 and the third electrode ED3 receive different voltages from one another in the on state of the narrow viewing angle mode. For instance, the third electrode ED3 receives a voltage about 10 volts to about 15 volts higher than the second electrode ED2. Thus, a fringe field, i.e., a horizontal electric field, is formed between the second electrode ED2 and the third electrode ED3. In this case, the first electrode ED1 maintains a floating state in which no voltage is applied. Accordingly, the first electrode ED1 does not exert any influence on the horizontal electric field.

When the horizontal electric field is formed in the twisted nematic liquid crystal layer LCL, the first liquid crystals LC1 and the second liquid crystals LC2 are aligned substantially in parallel to the first substrate SUB1 and the second substrate SUB2.

The first liquid crystals LC1 and the second liquid crystals LC2 are aligned in directions crossing, preferably perpendicular to, the slits SLT. That is, the first liquid crystals LC1 and the second liquid crystals LC2 are splayed without being twisted.

In the first liquid crystals LC1 and the second liquid crystals LC2, the portion of the liquid crystal directors adjacent to the second substrate SUB2 may be aligned in substantially parallel to the slits SLT. This is because the portion of the liquid crystal directors adjacent to the second substrate SUB2 is influenced by the direction of the alignment axis rather than the horizontal electric field.

Figure 7A:
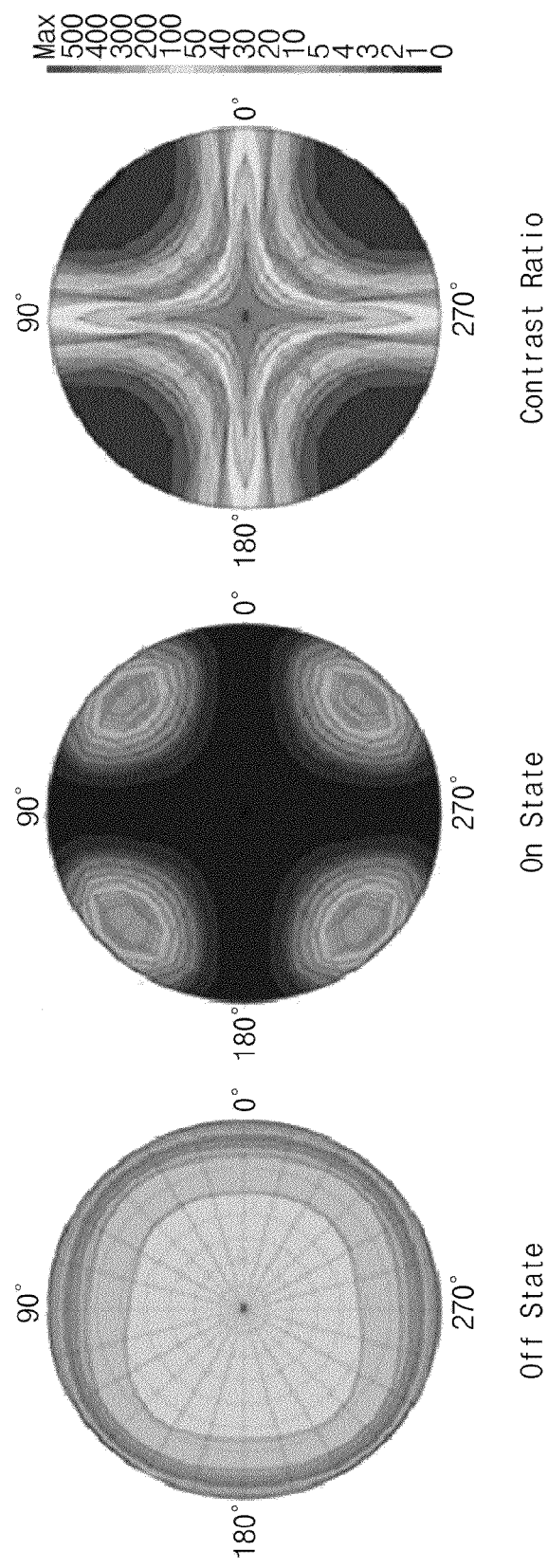
Figure 8:
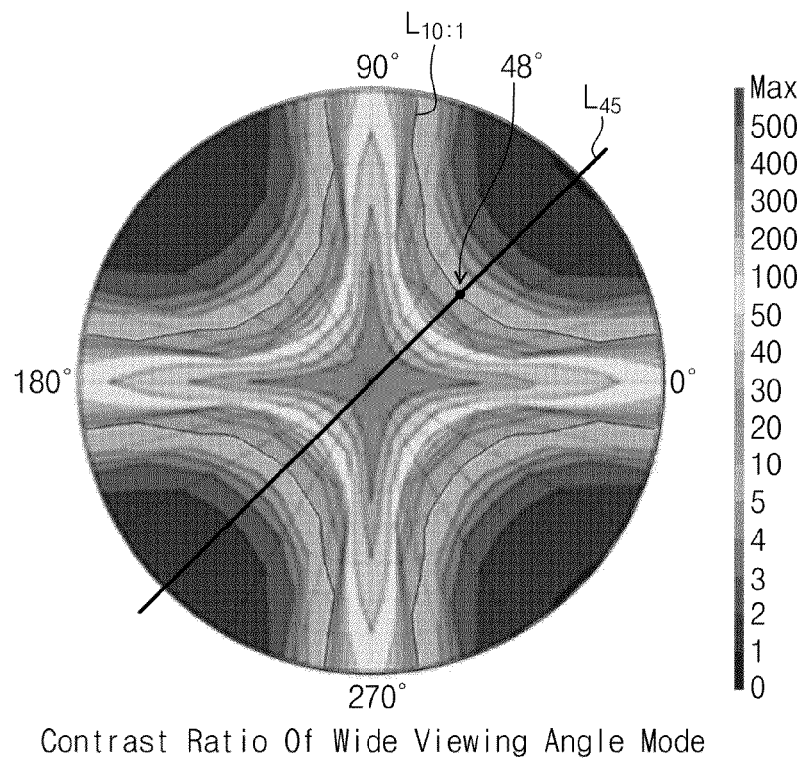
FIG. 8 is enlarged views showing a contrast ratio of the wide viewing angle mode shown in FIG. 7A and a contrast ratio of the narrow viewing angle mode shown in FIG. 7B.
Figure 8:
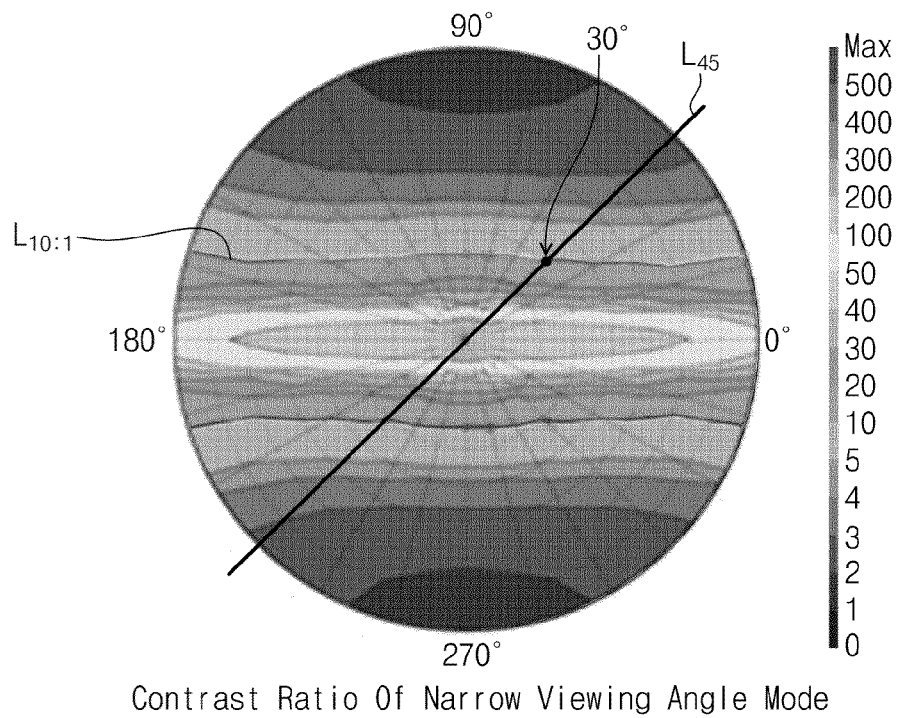

FIGS. 7A and 7B are views showing characteristics of viewing angle of the liquid crystal display device shown in FIG. 1. FIG. 7A shows the characteristics of the viewing angle in the wide viewing angle mode and FIG. 7B shows the characteristics of the viewing angle in the narrow viewing angle mode. FIG. 8 is enlarged views showing a contrast ratio of the wide viewing angle mode shown in FIG. 7A and a contrast ratio of the narrow viewing angle mode shown in FIG. 7B. FIGS. 7A and 7B show values obtained by converting transmittance of the light measured in the off state and the on state to the contrast ratio in polar coordinates.

The characteristics of the viewing angle of the wide viewing angle mode shown in FIG. 7A is improved in symmetry rather than the characteristics of the viewing angle of the narrow viewing angle mode shown in FIG. 7B. As shown in FIGS. 7A and 7B, upper and lower viewing angle characteristics and left and right viewing angle characteristics of the wide viewing angle mode are uniform, but upper and lower viewing angle characteristics and left and right viewing angle characteristics of the narrow viewing angle mode are non-uniform.

In the on state of the wide viewing angle mode, the first liquid crystals LC1 and the second liquid crystals LC2 are vertically aligned to the first substrate SUB1 and the second substrate SUB2 in different domains, respectively, and thus a black image symmetrical in upper and lower directions and in left and right directions is displayed in the pixel.

Although the first liquid crystals LC1 and the second liquid crystals LC2 are aligned in the splay state during the narrow viewing angle mode, the first liquid crystals LC1 and the second liquid crystals LC2 have the inclination angle against the first substrate SUB1 and the second substrate SUB2. In this case, the inclined direction of the first liquid crystals LC1 with respect to the first substrate SUB1 and the second substrate SUB2 is different from the inclined direction of the second liquid crystals LC2 with respect to the first substrate SUB1 and the second substrate SUB2. Thus, the light is leaked in upper and lower directions of the pixel PXij.

In addition, as described with reference to FIG. 6B, among the first liquid crystals LC1 and the second liquid crystals LC2, the portion of the liquid crystal directors adjacent to the second substrate SUB2 is aligned in substantially parallel to the slits SLT. The portion of the liquid crystal directors adjacent to the second substrate SUB2 causes the leakage of the light in the upper and lower directions, so that the black image asymmetrical in upper and lower directions and in left and right directions is displayed in the pixel.

According to FIG. 8, a polar coordinate at which a line $L_{10:1}$ having a contrast ratio of 10:1 and a line $L_{45}$ inclined by about 45 degrees with respect to the first and second transmission axes T1 and T2 (refer to FIG. 1) meets, is about 48 degrees in the wide viewing angle mode and is about 30 degrees in the narrow viewing angle mode. Accordingly, the viewing angle of the wide viewing angle mode is wider than the viewing angle of the narrow viewing angle mode.

Figure 9:
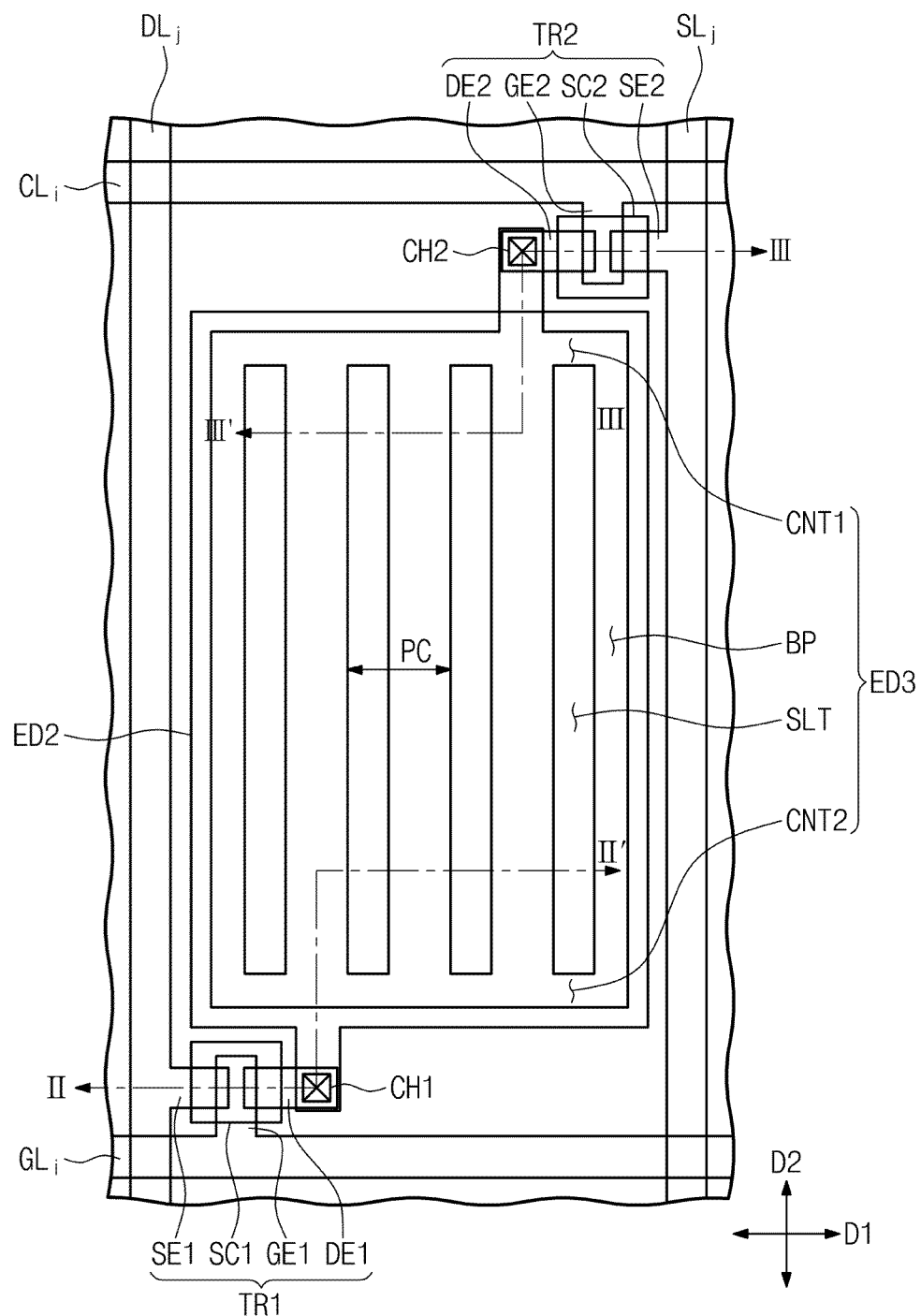
FIG. 9 is a plan view showing the pixel shown in FIG. 3.
Figure 10A:
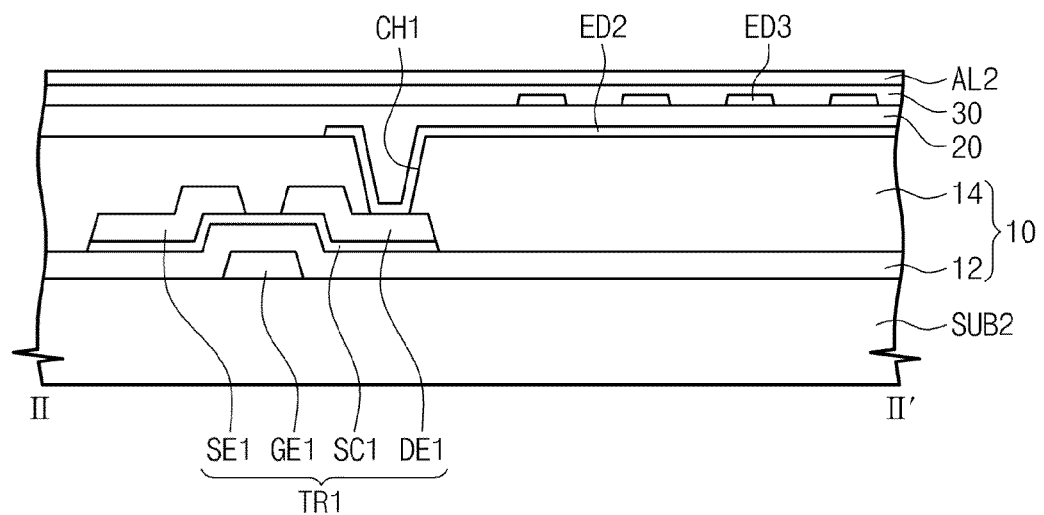
FIG. 10A is a cross-sectional view taken along a line II-II' of FIG. 9.
Figure 10B:
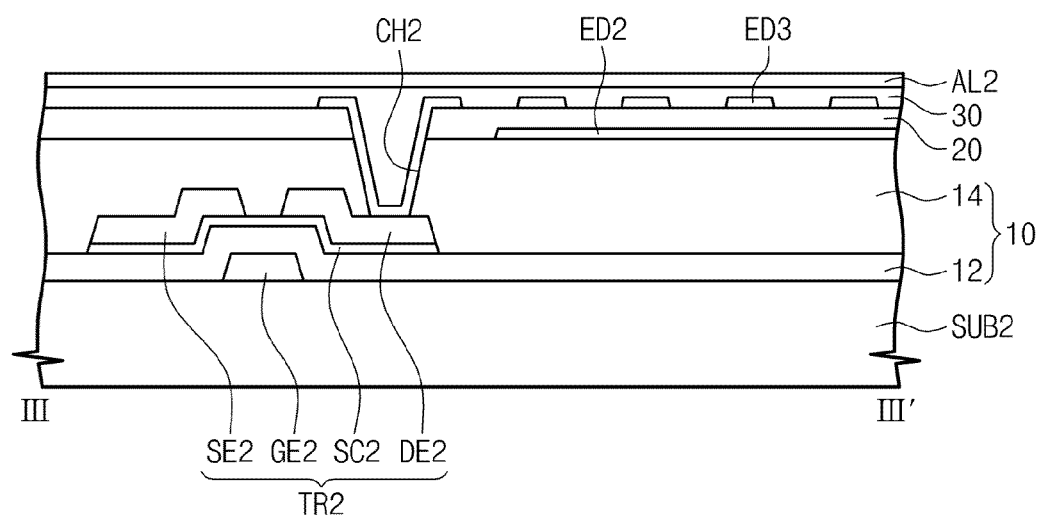
FIG. 10B is a cross-sectional view taken along a line III-III' of FIG. 9.

FIG. 9 is a plan view showing the pixel shown in FIG. 3, FIG. 10A is a cross-sectional view taken along a line II-II' of FIG. 9, and FIG. 10B is a cross-sectional view taken along a line III-III' of FIG. 9. In FIGS. 9, 10A, and 10B, the same reference numerals denote the same elements in FIG. 3, and thus detailed descriptions of the same elements will be omitted. In addition, the first substrate SUB1 is omitted in FIGS. 9, 10A, and 10B.

Referring to FIG. 9, the pixel PXij includes the second electrode ED2, the third electrode ED3 insulated from the second electrode ED2, a first thin film transistor TR1 applying the data voltage to the second electrode ED2, and a second thin film transistor TR2 applying the source voltage to the third electrode ED3.

The first thin film transistor TR1 is connected to a gate line GLi and a data line DLj, which correspond to the pixel PXij. The second thin film transistor TR2 is connected to a scan line CLi and a source line SLj, which correspond to the pixel PXij.

The third electrode ED3 includes the slits SLT and branch portions BP alternately arranged with the slits SLT. The third electrode ED3 has a rectangular shape when viewed in a plan view. First ends of the branch portions BP are connected to each other by a first connection portion CNT1 and second ends of the branch portions BP are connected to each other by a second connection portion CNT2. The first connection portion CNT1 is connected to the second thin film transistor TR2 through a second contact hole CH2. The second connection portion CNT2 may be omitted.

In the present exemplary embodiment, a sum of a width of one of the slits SLT and a width of one of the branch portions BP which are adjacent to each other is defined as a pitch PC. The pitch PC is in a range from about 10 micrometers to about 12 micrometers. The width of the branch portion BP is in a range from about 3 micrometers to about 5 micrometers. For instance, a ratio of the width of the branch portion to the width of the slit, which are included in one pitch, may be approximately 3 μm:7 μm, 4 μm:6 μm, 4 μm:7 μm, 5 μm:5 μm, or 5 μm:7 μm.

The first thin film transistor TR1 includes a first gate electrode GE1, a first source electrode SE1, a first drain electrode DE1, and a first semiconductor layer SC1. The second thin film transistor TR2 includes a second gate electrode GE2, a second source electrode SE2, a second drain electrode DE2, and a second semiconductor layer SC2.

Referring to FIGS. 10A and 10B, the corresponding gate line GLi and the corresponding scan line CLi are disposed on the surface of the second substrate SUB2. The first gate electrode GE1 is branched from the corresponding gate line GLi and the second gate electrode GE2 is branched from the corresponding scan line CLi.

A first insulating thin layer 12 is disposed on the second substrate SUB2 to cover the first gate electrode GE1 and the second gate electrode GE2. The first insulating thin layer 12 may include silicon nitride or silicon oxide.

The first semiconductor layer SC1 and the second semiconductor layer SC2 are disposed on the first insulating thin layer 12. The first semiconductor layer SC1 and the second semiconductor layer SC2 are respectively overlapped with the first gate electrode GE1 and the second gate electrode GE2 while interposing the first insulating thin layer 12 therebetween. Each of the first semiconductor layer SC1 and the second semiconductor layer SC2 includes an active layer and an ohmic contact layer disposed on the active layer.

The corresponding data line DLj and the corresponding source line SLj are disposed on the first insulating thin layer 12. The corresponding data line DLj and the corresponding source line SLj may be disposed on the ohmic contact layer disposed on the active layer. The first source electrode SE1 is branched from the corresponding data line DLj and the second source electrode SE2 is branched from the corresponding source line SLj. The first source electrode SE1 and the second source electrode SE2 are respectively overlapped with the first semiconductor layer SC1 and the second semiconductor layer SC2.

The first drain electrode DE1 and the second drain electrode DE2 are spaced apart from the first source electrode SE1 and the second source electrode SE2, respectively. The first drain electrode DE1 and the second drain electrode DE2 are overlapped with the first semiconductor layer SC1 and the second semiconductor layer SC2, respectively.

A second insulating thin layer 14 is disposed on the first insulating thin layer 12. The second electrode ED2 is disposed on the second insulating thin layer 14. The second electrode ED2 is connected to the first drain electrode DE1 through a first contact hole CH1 formed through the second insulating thin layer 14.

A third insulating thin layer 20 is disposed on the second insulating thin layer 14 to cover the second electrode ED2. The third electrode ED3 is disposed on the third insulating thin layer 20. The third electrode ED3 is connected to the second drain electrode DE2 through the second contact hole CH2 formed through the second insulating thin layer 14 and the third insulating thin layer 20.

A protective layer 30 is disposed on the third insulating thin layer 20 to protect the third electrode ED3. In addition, the second alignment layer AL2 is disposed on the protective layer 30. The protective layer 30 may be omitted.

Figure 11:
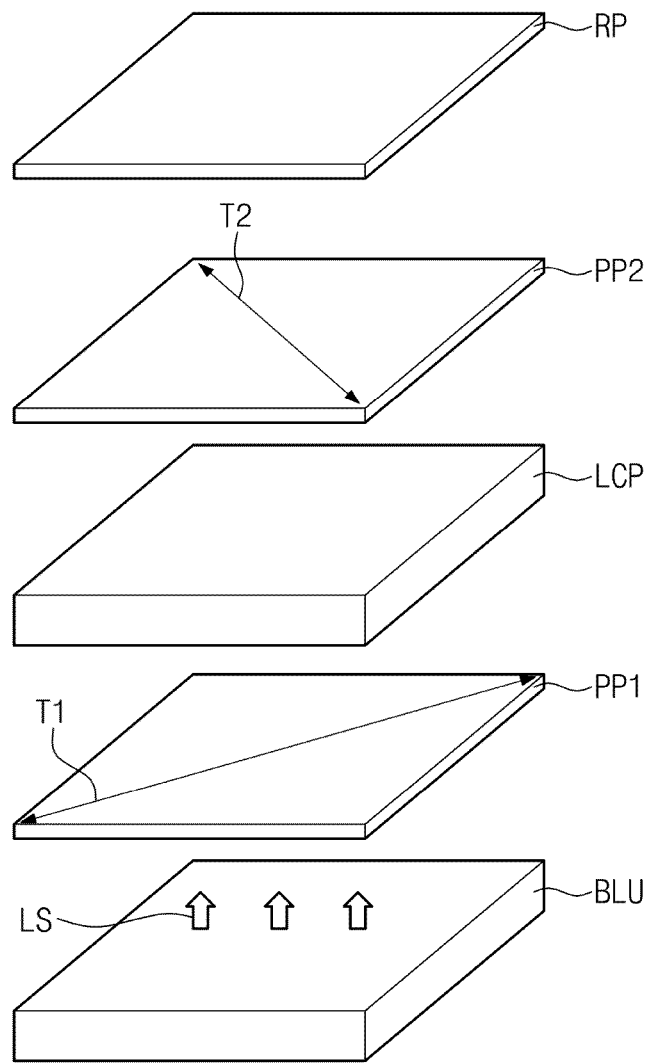
FIG. 11 is an exploded perspective view showing a liquid crystal display device according to an exemplary embodiment of the present invention.

FIG. 11 is an exploded perspective view showing a liquid crystal display device according to an exemplary embodiment of the present invention. The liquid crystal display device shown in FIG. 11 further includes a negative (−) C-plate RP in addition to the liquid crystal display device shown in FIG. 1. In FIG. 11, the same reference numerals denote the same elements in FIG. 1, and thus detailed descriptions of the same elements will be omitted.

The negative (−) C-plate RP is a compensation film having an anisotropic refractive index, for example, ne<no. In detail, the negative C-plate RP has a surface direction refractive index no in which a refractive index nx in an X-direction is equal to a refractive index ny in a Y-direction. The negative C-plate RP has a thickness direction refractive index ne in which a refractive index nz in a normal line direction to a surface defined by X and Y axes is smaller than the surface direction refractive index no. For instance, the negative C-plate RP may be, but not limited to, a film including a discotic liquid crystal layer.

In the off state of the wide viewing angle mode, the first liquid crystals LC1 (refer to FIG. 5B) and the second liquid crystals LC2 (refer to FIG. 5B) are substantially vertically aligned with respect to the first substrate SUB1 and the second substrate SUB2. The first liquid crystals LC1 and the second liquid crystals LC2, which are vertically aligned, have a function of a positive C-plate. That is, the refractive index ny in the Y-direction of the first and second liquid crystals LC1 and LC2 vertically aligned is substantially equal to the refractive index nx in the X-direction of the first and second liquid crystals LC1 and LC2 vertically aligned, and the refractive index nz in the normal line direction are greater than the refractive index nx in the X-direction. Accordingly, when the first and second liquid crystals LC1 and LC2 vertically aligned are viewed in a side view, a positive phase difference occurs.

The positive phase difference of the first and second liquid crystals LC1 and LC2 vertically aligned is offset by a negative phase difference of the negative C-plate RP. Thus, the viewing angle of the liquid crystal display device is increased.

In the off state of the narrow viewing angle mode, the first liquid crystals LC1 (refer to FIG. 6B) and the second liquid crystals LC2 (refer to FIG. 6B) are aligned substantially in parallel to the first substrate SUB1 and the second substrate SUB2. The first liquid crystals LC1 and the second liquid crystals LC2, which are aligned in parallel, have a function of a positive A-plate. That is, the refractive index ny in the Y-direction of the first and second liquid crystals LC1 and LC2 horizontally aligned is substantially equal to the refractive index nz in the normal line direction of the first and second liquid crystals LC1 and LC2 horizontally aligned, and the refractive index ny in the Y-direction and the refractive index nz in the normal line direction are smaller than the refractive index nx in the X-direction. Accordingly, when the first and second liquid crystals LC1 and LC2 horizontally aligned are viewed in a side view, a negative phase difference occurs.

The negative phase difference of the first and second liquid crystals LC1 and LC2 horizontally aligned is enhanced by the negative phase difference of the negative C-plate RP. Thus, the viewing angle of the liquid crystal display device is decreased.

The liquid crystal display device shown in FIG. 11 includes one negative C-plate RP disposed on the second polarizer PP2, but it should not be limited thereto or thereby. That is, the negative C-plate RP may be disposed under the first polarizer PP1. In addition, the negative C-plate RP may be disposed on the second polarizer PP2 and under the first polarizer PP1.

Figure 12A:
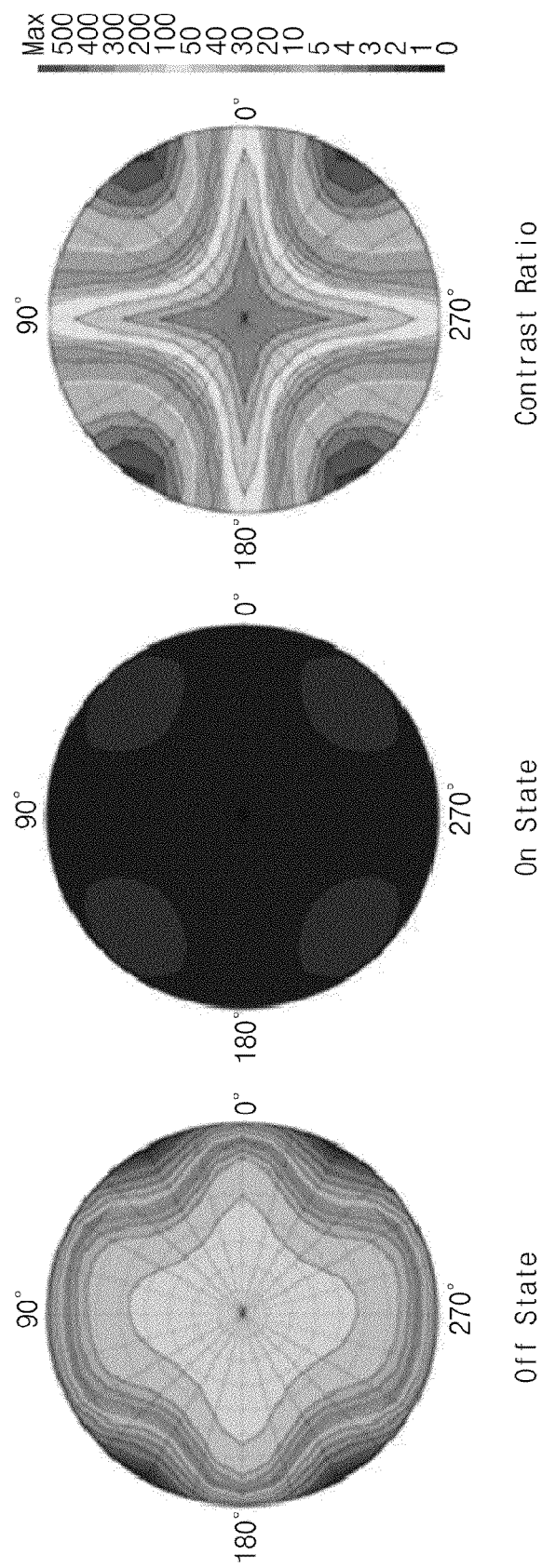
FIGS. 12A and 12B are views showing characteristics of viewing angle of the liquid crystal display device shown in FIG. 11.
Figure 12B:
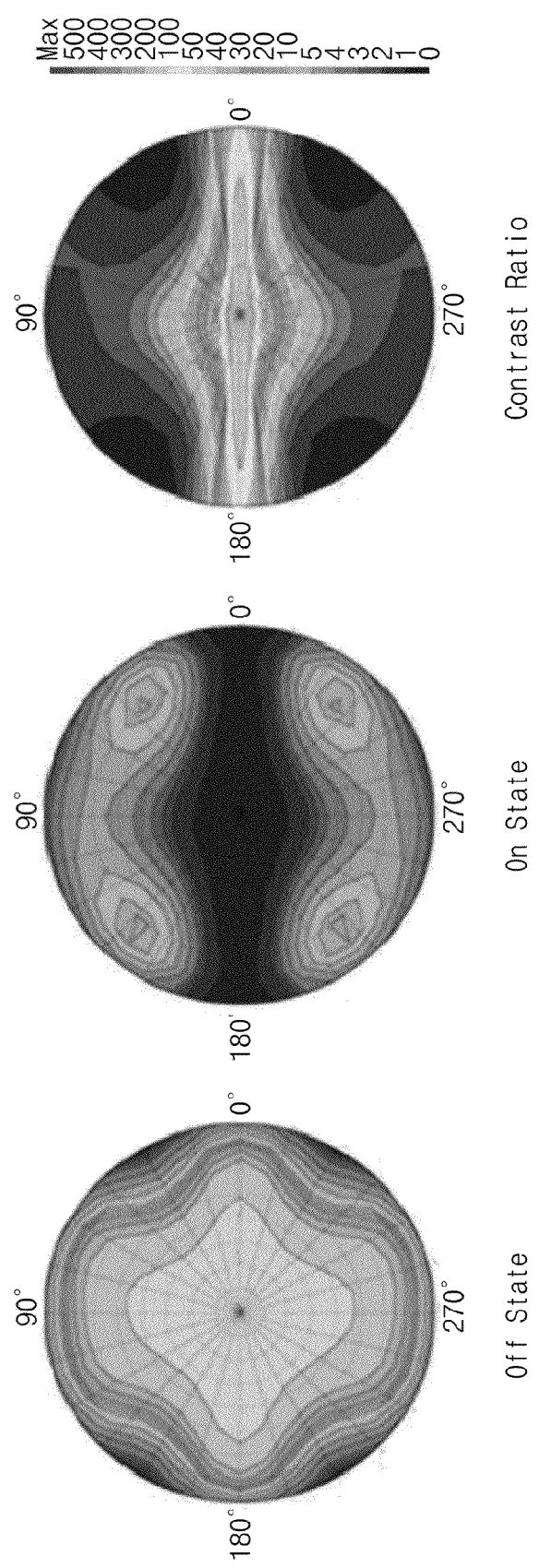
Figure 13:
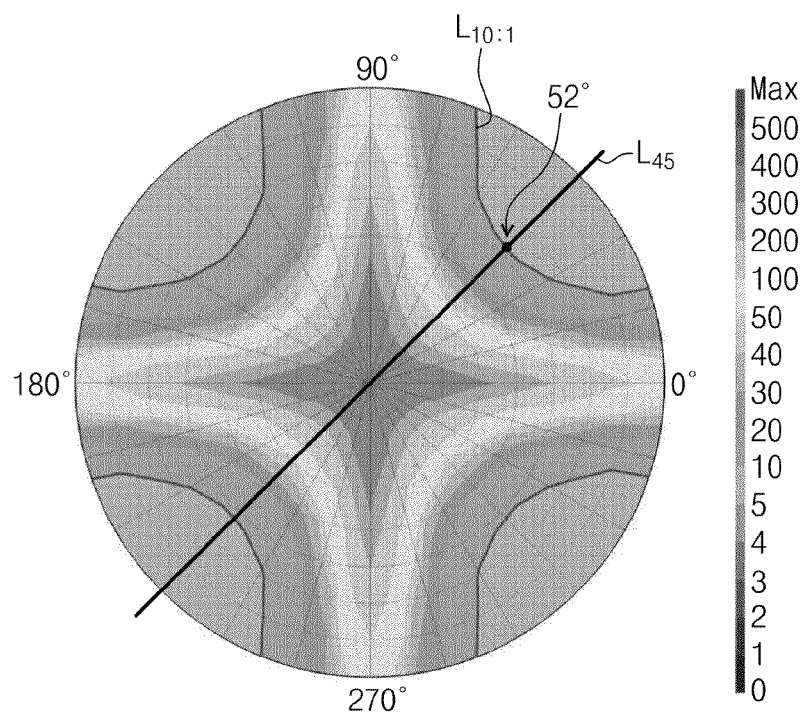
FIG. 13 is enlarged views showing a contrast ratio of the wide viewing angle mode shown in FIG. 12A and a contrast ratio of the narrow viewing angle mode shown in FIG. 12B, respectively.
Figure 13:
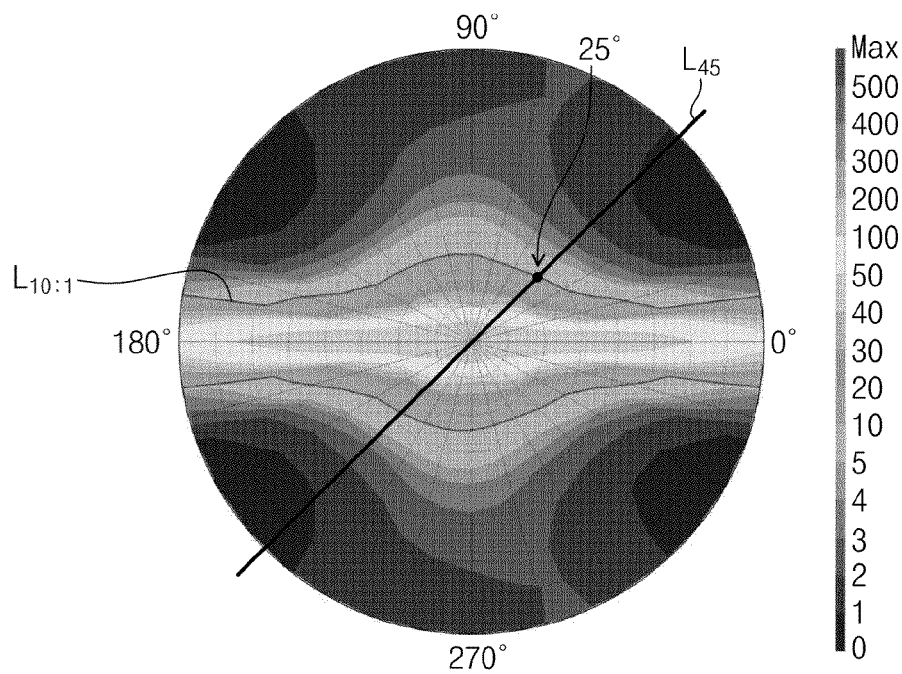

FIGS. 12A and 12B are views showing characteristics of viewing angle of the liquid crystal display device shown in FIG. 11. FIG. 12A shows the characteristics of the viewing angle of the wide viewing angle mode and FIG. 12B shows the characteristics of the viewing angle of the narrow viewing angle mode. FIG. 13 is enlarged views showing a contrast ratio of the wide viewing angle mode shown in FIG. 12A and a contrast ratio of the narrow viewing angle mode shown in FIG. 12B.

As shown in FIGS. 12A and 12B, the liquid crystal display device according to the present exemplary embodiment provides the viewing angle wider than that of the liquid crystal display device shown in FIGS. 7A and 7B in the wide viewing angle mode and provides the viewing angle narrower than that of the liquid crystal display device shown in FIGS. 7A and 7B in the narrow viewing angle mode.

Referring FIG. 13, a polar coordinate at which a line $L_{10:1}$ having a contrast ratio of 10:1 and a line $L_{45}$ inclined by about 45 degrees with respect to the first and second transmission axes T1 and T2 (refer to FIG. 1) meets is about 52 degrees in the wide viewing angle mode and is about 25 degrees in the narrow viewing angle mode. When compared to those shown in FIG. 8, the angle between the line $L_{10:1}$ and the line $L_{45}$ becomes wider by about four degrees in the wide viewing angle mode and becomes narrower by about five degrees in the narrow viewing angle mode.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display panel comprising:
a first substrate that includes a first electrode;
a second substrate that includes a pixel divided into a first domain and a second domain and faces the first substrate; and
a twisted nematic liquid crystal layer that includes first liquid crystals disposed corresponding to the first domain and second liquid crystals disposed corresponding to the second domain and twisted in a direction different from a direction in which the first liquid crystals are twisted, the twisted nematic liquid crystal layer being disposed between the first substrate and the second substrate, the pixel comprising:
a second electrode; and
a third electrode insulated from the second electrode and overlapped with the second electrode, and including a plurality of slits formed therethrough.

2. The liquid crystal display panel of claim 1, wherein the liquid crystal display panel is operated in a wide viewing angle mode or a narrow viewing angle mode providing a viewing angle different from a viewing angle of the wide viewing angle mode, a first driving voltage is applied between the first electrode and the second electrode in the wide viewing angle mode to form a vertical electric field in the twisted nematic liquid crystal layer, and the first liquid crystals and the second liquid crystals are aligned vertical to the first substrate and the second substrate by the vertical electric field.

3. The liquid crystal display panel of claim 2, wherein a second driving voltage is applied between the second electrode and the third electrode in the narrow viewing angle mode to form a horizontal electric field in the twisted nematic liquid crystal layer, and the first liquid crystals and the second liquid crystals are aligned substantially in parallel to the first substrate and the second substrate by the horizontal electric field.

4. The liquid crystal display panel of claim 1, wherein the first substrate comprises a first alignment layer disposed on the first electrode, the second substrate comprises a second alignment layer disposed on the third electrode, the second alignment layer has a first alignment axis in an area corresponding to the first domain and a second alignment axis in an area corresponding to the second domain, which is opposite to the first alignment axis.

5. The liquid crystal display panel of claim 4, wherein the first alignment axis is defined by a first rubbing direction and the second alignment axis defined by a second rubbing direction, which is opposite to the first rubbing direction.

6. The liquid crystal display panel of claim 5, wherein the first alignment layer has a third alignment axis substantially perpendicular to the first alignment axis and the second alignment axis.

7. The liquid crystal display panel of claim 1, further comprising a gate line disposed on the first substrate, a data line insulated from the gate line while crossing the gate line, a scan line substantially in parallel to the gate line, and a source line insulated from the scan line while crossing the scan line.

8. The liquid crystal display panel of claim 7, wherein the pixel further comprises:
a first thin film transistor connected to the gate line and the data line to apply a data voltage to the second electrode; and
a second thin film transistor connected to the scan line and the source line to apply a source voltage to the third electrode.

9. The liquid crystal display panel of claim 1, wherein the third electrode comprises a plurality of branch portions alternately arranged with the slits.

10. The liquid crystal display panel of claim 9, wherein a sum of a width of one of the slits and a width of one of the branch portions which are adjacent to each other is defined as a pitch, the pitch is in a range from about 10 micrometers to about 12 micrometers, and the width of the branch portion is in a range from about 3 micrometers to about 5 micrometers.

11. A liquid crystal display device comprises:
a liquid crystal display panel operated in a wide viewing angle mode and a narrow viewing angle mode, which provide different viewing angles from one another;
a first polarizer disposed under the liquid crystal display panel and having a first transmission axis;
a second polarizer disposed on the liquid crystal display panel and having a second transmission axis crossing the first transmission axis; and a backlight unit disposed under the first polarizer to provide a light to the liquid crystal display panel, the liquid crystal display panel comprising:
  a first substrate that includes a first electrode;
  a second substrate that includes a pixel divided into a first domain and a second domain and faces the first substrate; and
  a twisted nematic liquid crystal layer that includes first liquid crystals disposed corresponding to the first domain and second liquid crystals disposed corresponding to the second domain and twisted in a direction different from a direction in which the first liquid crystals area twisted, the twisted nematic liquid crystal layer being disposed between the first substrate and the second substrate,
  wherein the pixel comprises a second electrode and a third electrode insulated from and overlapped with the second electrode and including a plurality of slits formed therethrough.

12. The liquid crystal display device of claim 11, further comprising a negative C-plate disposed at least one of a lower portion of the first polarizer and an upper portion of the second polarizer.

13. The liquid crystal display device of claim 11, wherein a first driving voltage is applied between the first electrode and the second electrode in the wide viewing angle mode to form a vertical electric field in the twisted nematic liquid crystal layer, and the first liquid crystals and the second liquid crystals are aligned vertical to the first substrate and the second substrate by the vertical electric field.

14. The liquid crystal display device of claim 13, wherein a second driving voltage is applied between the second electrode and the third electrode in the narrow viewing angle mode to form a horizontal electric field in the twisted nematic liquid crystal layer, and the first liquid crystals and the second liquid crystals are aligned substantially in parallel to the first substrate and the second substrate by the horizontal electric field.

15. The liquid crystal display device of claim 11, wherein the first transmission axis is substantially perpendicular to the second transmission axis.

16. The liquid crystal display device of claim 15, wherein the first substrate comprises a first alignment layer disposed on the first electrode, the second substrate comprises a second alignment layer disposed on the third electrode, the second alignment layer has a first alignment axis in an area corresponding to the first domain, and the second alignment layer has a second alignment axis in an area corresponding to the second domain, which is opposite to the first alignment axis.

17. The liquid crystal display device of claim 16, wherein the first alignment layer has a third alignment axis substantially perpendicular to the first alignment axis and the second alignment axis.

18. The liquid crystal display device of claim 17, wherein the first alignment axis and the second alignment axis are substantially parallel to the first transmission axis and the third alignment axis is substantially parallel to the second transmission axis.

* * * * *